United States Patent
Fujimoto et al.

(10) Patent No.: US 8,240,119 B2
(45) Date of Patent: Aug. 14, 2012

(54) HIGH-STRENGTH CABLE

(75) Inventors: Yoshihiro Fujimoto, Tokyo (JP);
Katsuya Sakamoto, Tokyo (JP);
Tatsushi Fujimori, Ibaraki (JP); Hajime Izawa, Ibaraki (JP); Hiroyuki Osawa, Yokosuka (JP); Takashi Murashima, Yokosuka (JP); Kikuo Hashimoto, Yokosuka (JP)

(73) Assignees: Furukawa Electric Co., Ltd., Tokyo (JP); Japan Agency for Marine-Earth Science and Technology, Yokosuka-shi (JP)

( * ) Notice: Subject to any disclaimer, the term of this patent is extended or adjusted under 35 U.S.C. 154(b) by 13 days.

(21) Appl. No.: 12/918,687

(22) PCT Filed: Feb. 18, 2009

(86) PCT No.: PCT/JP2009/052750
§ 371 (c)(1),
(2), (4) Date: Aug. 20, 2010

(87) PCT Pub. No.: WO2009/104633
PCT Pub. Date: Aug. 27, 2009

(65) Prior Publication Data
US 2010/0326038 A1  Dec. 30, 2010

(30) Foreign Application Priority Data
Feb. 21, 2008 (JP) .................. 2008-039613

(51) Int. Cl.
*D02G 3/02* (2006.01)

(52) U.S. Cl. .............. 57/230; 57/231; 57/232
(58) Field of Classification Search ............. 57/210, 57/230, 231, 232
See application file for complete search history.

(56) References Cited

U.S. PATENT DOCUMENTS

| | | | | |
|---|---|---|---|---|
| 6,898,354 | B2 * | 5/2005 | Kim et al. | 385/100 |
| 7,254,934 | B2 * | 8/2007 | Wu | 57/241 |
| 2004/0068972 | A1 * | 4/2004 | Kanno et al. | 57/210 |
| 2004/0109650 | A1 * | 6/2004 | Kim et al. | 385/100 |
| 2006/0213174 | A1 * | 9/2006 | Wu | 57/237 |
| 2008/0148704 | A1 * | 6/2008 | Angelis | 57/251 |
| 2008/0149430 | A1 * | 6/2008 | De Angelis | 187/251 |

FOREIGN PATENT DOCUMENTS

| | | |
|---|---|---|
| JP | 5 154919 | 6/1993 |
| JP | 7 54651 | 6/1995 |
| JP | 2000 290849 | 10/2000 |
| JP | 2005 70202 | 3/2005 |

* cited by examiner

*Primary Examiner* — Shaun R Hurley
(74) *Attorney, Agent, or Firm* — Oblon, Spivak, McClelland, Maier & Neustadt, L.L.P.

(57) ABSTRACT

A high-strength cable having a twisted layer of non-metallic reinforcing elements in outer coatings is disclosed. The reinforcing elements include coating elements, fiber elements of copolyparaphenylene-3,4'-oxydiphenyleneterephthalic amide disposed in the coating elements, and filling materials filled between the fiber elements, respectively. The lateral compression stress of the fiber elements of the copolyparaphenylene-3,4'-oxydiphenyleneterephthalic amide is 75 cN/dtex or more.

16 Claims, 6 Drawing Sheets

(B) TEST RESULT

| KIND OF REINFORCING ELEMENTS | RESULT |
|---|---|
| COMPARATIVE EXAPLE 1 | FRACTURED AT 15000 CYCLES |
| EMBODIMENT 1 | NOT FRACTURED AT 60000 CYCLES |

FIG.6
Background Art

HIGH-STRENGTH CABLE

TECHNICAL FIELD

The present invention relates to a high-strength cable where fatigue resistance is increased and the lifespan until fracturing is increased, and more particularly, to a high-strength cable that is suitable for a tether cable for a deep-sea exploration machine used in an unmanned exploration system of a deep sea and transmitting electrical power and an optical signal.

BACKGROUND ART

In recent years, high-strength cables are required in various fields. As one of the high-strength cables, for example, a tether cable that is used in a sea or water is known.

Figure 6:
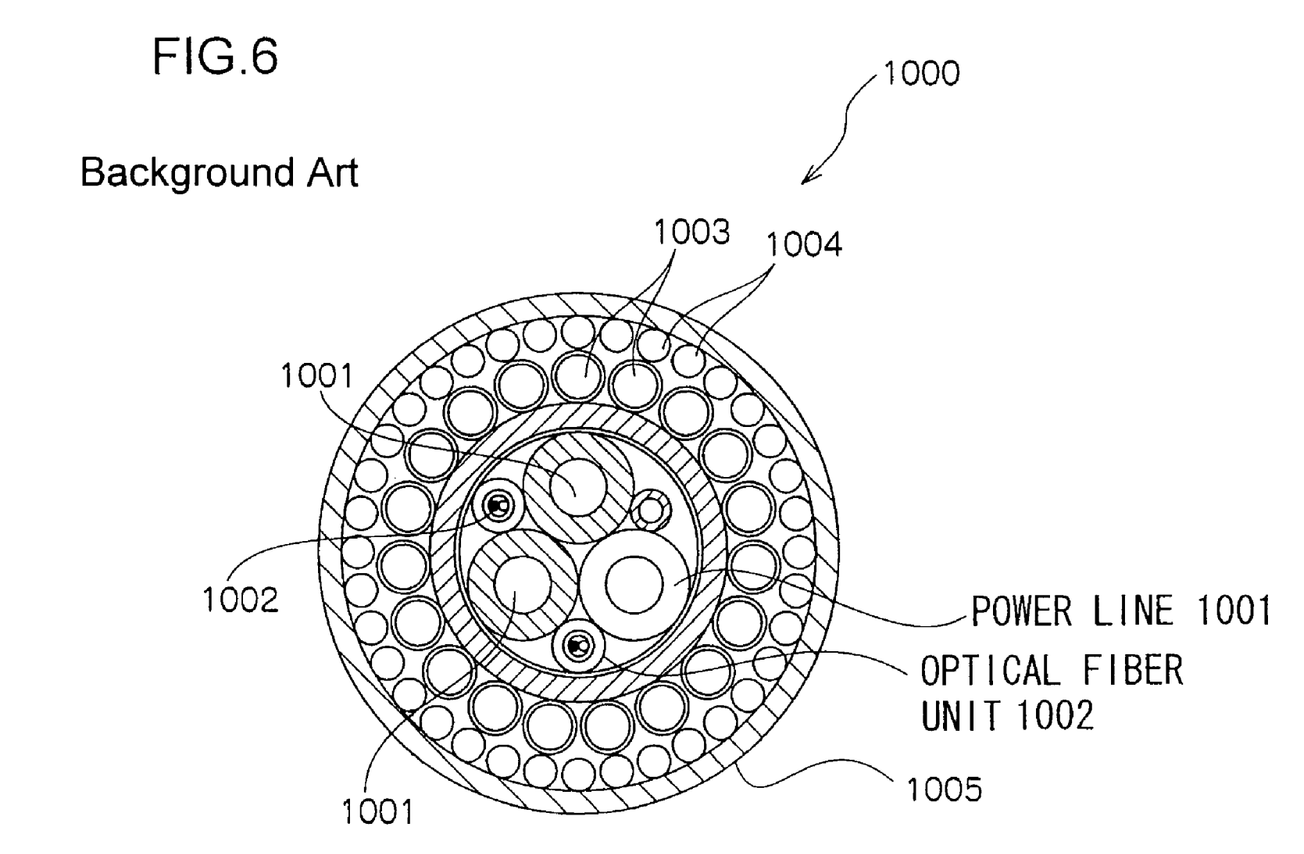
FIG. 6 is a cross-sectional view illustrating a high-strength cable (tether cable) according to the related art.

In an unmanned exploration system that is used in the sea or the water, a tether cable is used to transmit electrical power and an optical signal. FIG. 6 illustrates a sectional structure of a tether cable. A tether cable 1000 has plural power lines 1001, plural optical fiber units 1002, reinforcing elements 1003 and 1004, and an outer coating 1005. The reinforcing elements 1003 and 1004 constitute a twisted layer, and can be resistant against tension in a longitudinal direction and against a force applied in a torsional direction and prevent extension of the tether cable 1000 to prevent the tether cable 1000 from being bent.

The reinforcing elements 1003 and 1004 of the tether cable 1000 have plural fiber elements disposed in a coating element, and each of the fiber elements is made of a PPTA (polyparaphenylene terephthalamide) corresponding to an aramid fiber. As the PPTA, Kevlar (registered trademark) that is manufactured by Du Pont-Toray Co., Ltd. and TOWARON (registered trademark) that is manufactured by Teijin Aramid are used. As such, the reason why the aramid fiber is used as the fiber element is that, if the cable is elongated, because the cable becomes weight and is fractured due to its weight, the aramid fiber is used to decrease the weight of the cable and obtain high strength. The reinforcing elements 1003 and 1004 are twisted in two layers and opposite directions, and are solidified with a resin in the outer coating (for example, refer to Patent Document 1).

Patent Document: Japanese Patent Application Publication (JP-B) No. 7-54651

DISCLOSURE OF THE INVENTION

Problems to be Solved by the Invention

Meanwhile, if the reinforcing elements 1003 and 1004 using the fiber elements of the PPTA according to the related art are used, when the tether cable 1000 is used during a long period, the tether cable 1000 may be fatigued and degraded due to tension, bending, lateral pressure, and water pressure and the strength thereof may be gradually lowered. If the tether cable 1000 is continuously used as it is, the tether cable 1000 may be fractured. In particular, when the reinforcing elements using the fiber elements of the PPTA according to the related art are used in an unmanned exploration system of a deep sea, the strength of the tether cable may be further lowered.

Accordingly, the present invention has been made to solve the above-described problems, and it is an object of the present invention to provide a high-strength cable where fatigue resistance is increased and the lifespan until fracturing is increased.

Means for Solving the Problems

In order to solve the above problems, a high-strength cable according to the present invention is a high-strength cable that has a twisted layer of non-metallic reinforcing elements in outer coatings. The reinforcing elements are high-strength cables that include coating elements, fiber elements of copolyparaphenylene-3,4'-oxydiphenyleneterephthalic amide disposed in the coating elements, and filling materials filled between the fiber elements, respectively, and the horizontal compression stress of the fiber elements of the copolyparaphenylene-3,4'-oxydiphenyleneterephthalic amide is 75 cN/dtex or more.

In the high-strength cable according to the present invention, preferably, the surface hardness of the fiber elements of the copolyparaphenylene-3,4'-oxydiphenyleneterephthalic amide is 1% or more in a ratio with respect to the surface hardness of mica.

Effects of the Invention

According to the present invention, a high-strength cable where fatigue resistance is increased and the lifespan until fracturing is increased can be realized.

REFERENCE NUMERALS

1: unmanned exploration system
3: launcher
4: vehicle
10: high-strength cable (tether cable)
21: twisted layer of reinforcing elements
22: inner coating
23, 24, 25: power lines
26, 27: optical fiber unit
28: ground line
31: first reinforcing element layer
32: second reinforcing element layer
41: reinforcing element
42: reinforcing element
51: fiber element
61: fiber element
52: filling material
62: filling material

BEST MODE FOR CARRYING OUT THE INVENTION

Hereinafter, the preferred embodiments of the present invention will be described in detail with reference to the drawings.

Figure 1:
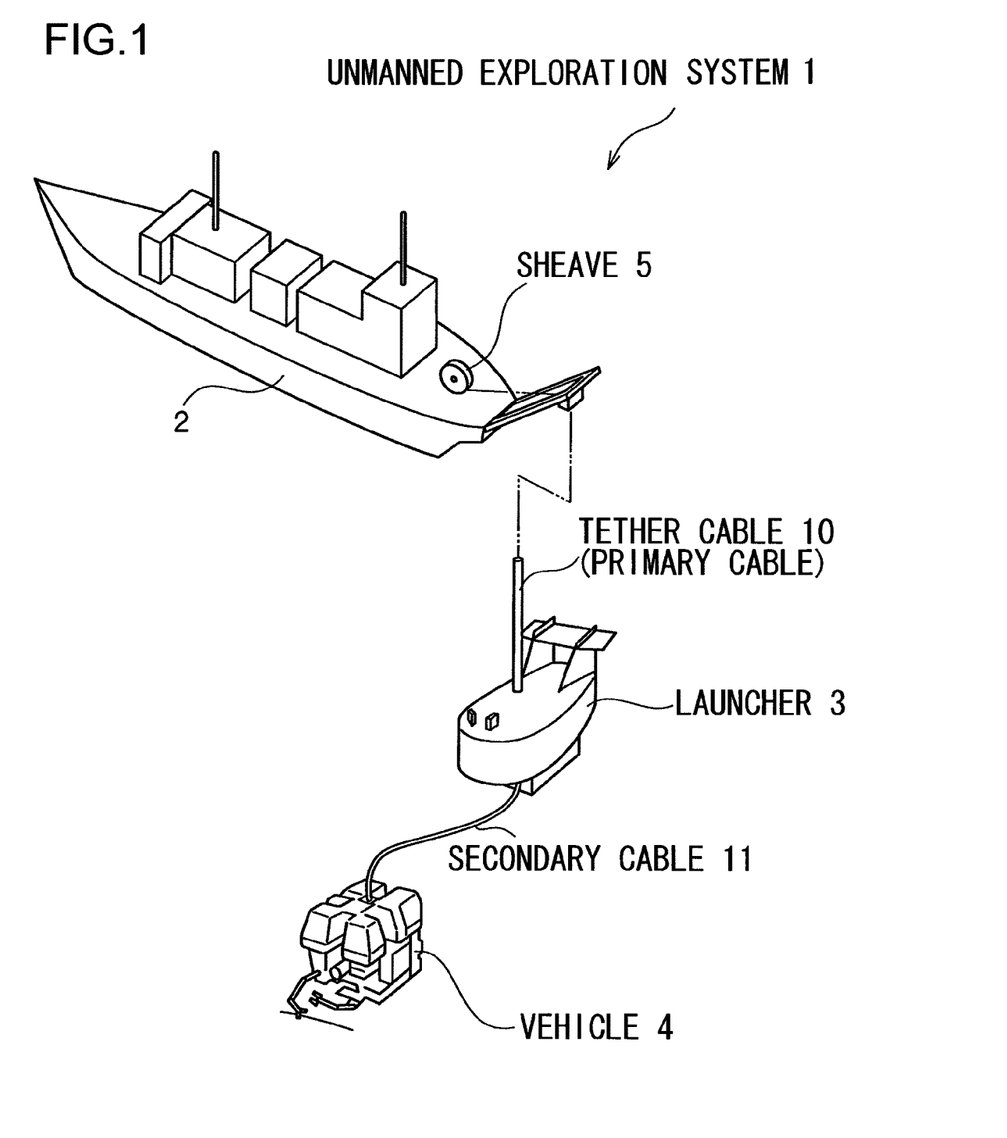
FIG. 1 is a perspective view illustrating an unmanned exploration system where a preferred embodiment of a high-strength cable (tether cable) according to the present invention is used.

FIG. 1 is a perspective view illustrating an unmanned exploration system where a preferred embodiment of a high-strength cable according to the present invention is used.

In FIG. 1, an unmanned exploration system 1 is used to search and develop an ocean, and includes a supporting mother vessel 2, a launcher 3, and a vehicle 4. The support mother ship 2 and the launcher 3 are connected by a tether cable 10 corresponding to a primary cable. The launcher 3 and the vehicle 4 are connected by a secondary cable 11. A high-strength cable according to an embodiment of the present invention may be used as both the tether cable 10 corresponding to the primary cable and the secondary cable 11. Here, however, the case where the high-strength cable according to the present invention is used as the tether cable 10 corresponding to the primary cable is exemplified. The tether cable 10 is delivered by a sheave 5 on the support mother ship 2.

The tether cable 10 and the secondary cable 11 can transmit power and an optical signal together.

Figure 2:
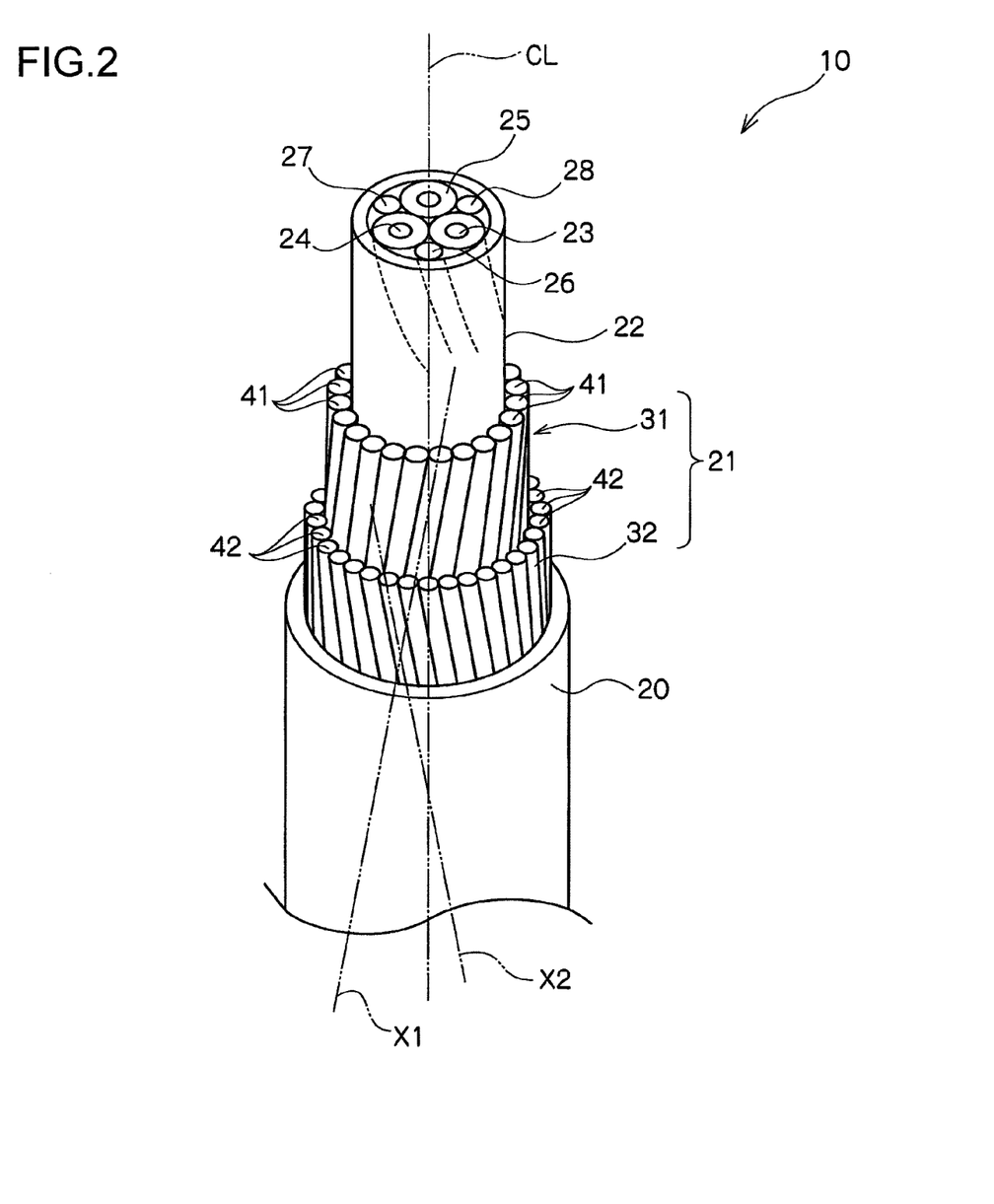
FIG. 2 is a perspective view illustrating an embodiment of a high-strength cable (tether cable) according to the present invention.
Figure 3:
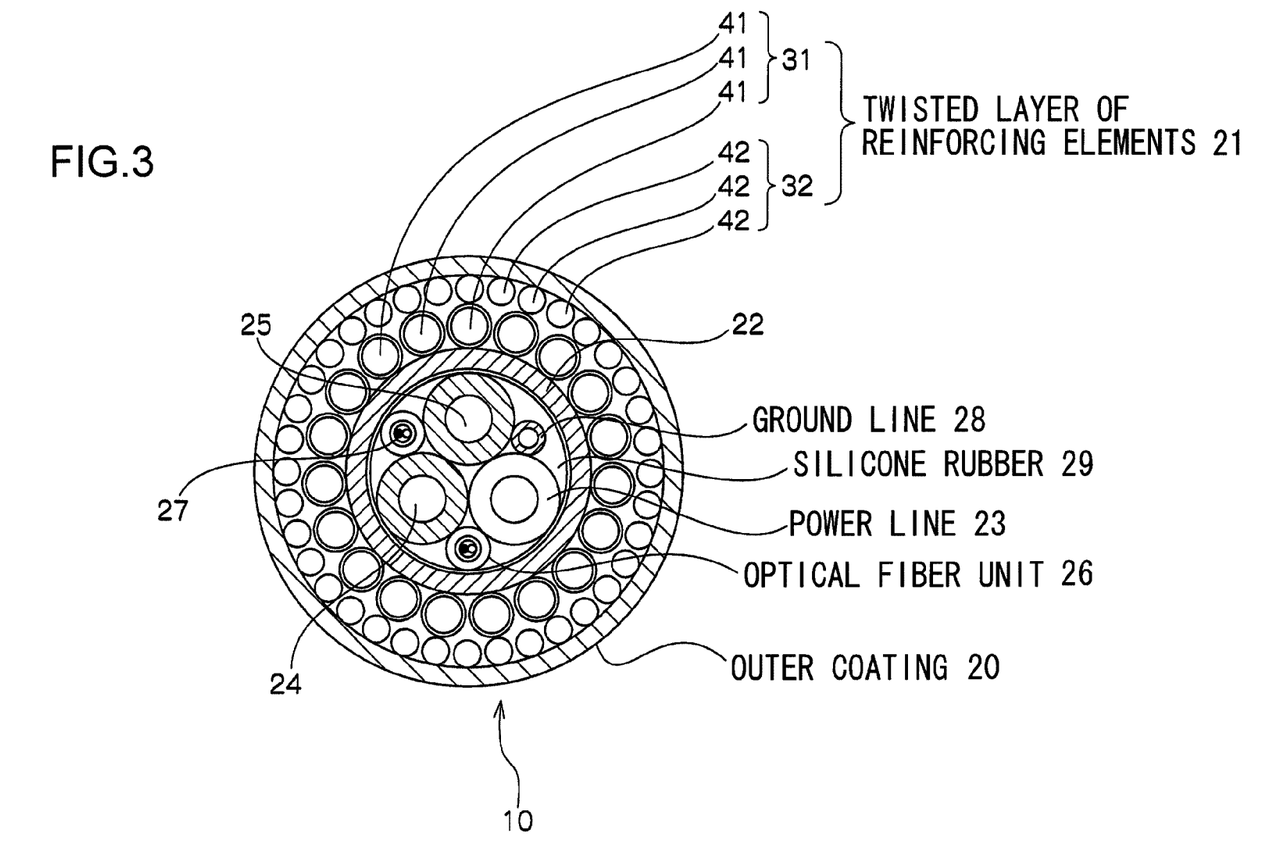
FIG. 3 is a cross-sectional view illustrating an embodiment of a high-strength cable (tether cable) according to the present invention.

FIG. 2 illustrates an example of the structure of the tether cable 10 illustrated in FIG. 1. FIG. 3 illustrates an example of the sectional structure of the tether cable 10.

As illustrated in FIGS. 2 and 3, the tether cable 10 is a cable that has a twisted layer 21 of non-metallic reinforcing elements in an outer coating 20. The outer coating 20 is made of polyester braid, and has the twisted layer 21 of the reinforcing elements, an inner coating 22, three-phase power lines 23, 24, and 25, optical fiber units 26 and 27, and a ground line 28 therein. The inner coating 22 is made of cross-linked polyethylene, and the three-phase power lines 23, 24, and 25 and the ground line 28 are copper lines.

The inner coating 22 incorporates the three-phase power lines 23, 24, and 25, the optical fiber units 26 and 27, and the ground line 28, and a filling material 29, such as silicone rubber, is filled into a gap in the inner coating 22.

As illustrated in FIGS. 2 and 3, the twisted layer 21 includes an inner first reinforcing element layer 31 that is separated from an inner surface of the outer coating 20 and an outer second reinforcing element 32 that contacts the inner surface of the outer coating 20. The first reinforcing element layer 31 includes plural reinforcing elements 41 and the second reinforcing element layer 32 includes plural reinforcing elements 42. The reinforcing elements 41 are thicker than the reinforcing elements 42. As illustrated in FIG. 2, the reinforcing elements 41 are arranged to be inclined in an X1 direction with respect to a central axis CL. Meanwhile, the reinforcing elements 42 are arranged to be inclined in an X2 direction opposite to the X1 direction with respect to the central axis CL.

Thereby, the first reinforcing element layer 31 and the second reinforcing element layer 32 can be resistant against tension in a longitudinal direction and against a force applied in a torsion direction and prevent extension of the tether cable 10 to prevent the tether cable 10 from being bent.

Figure 4:
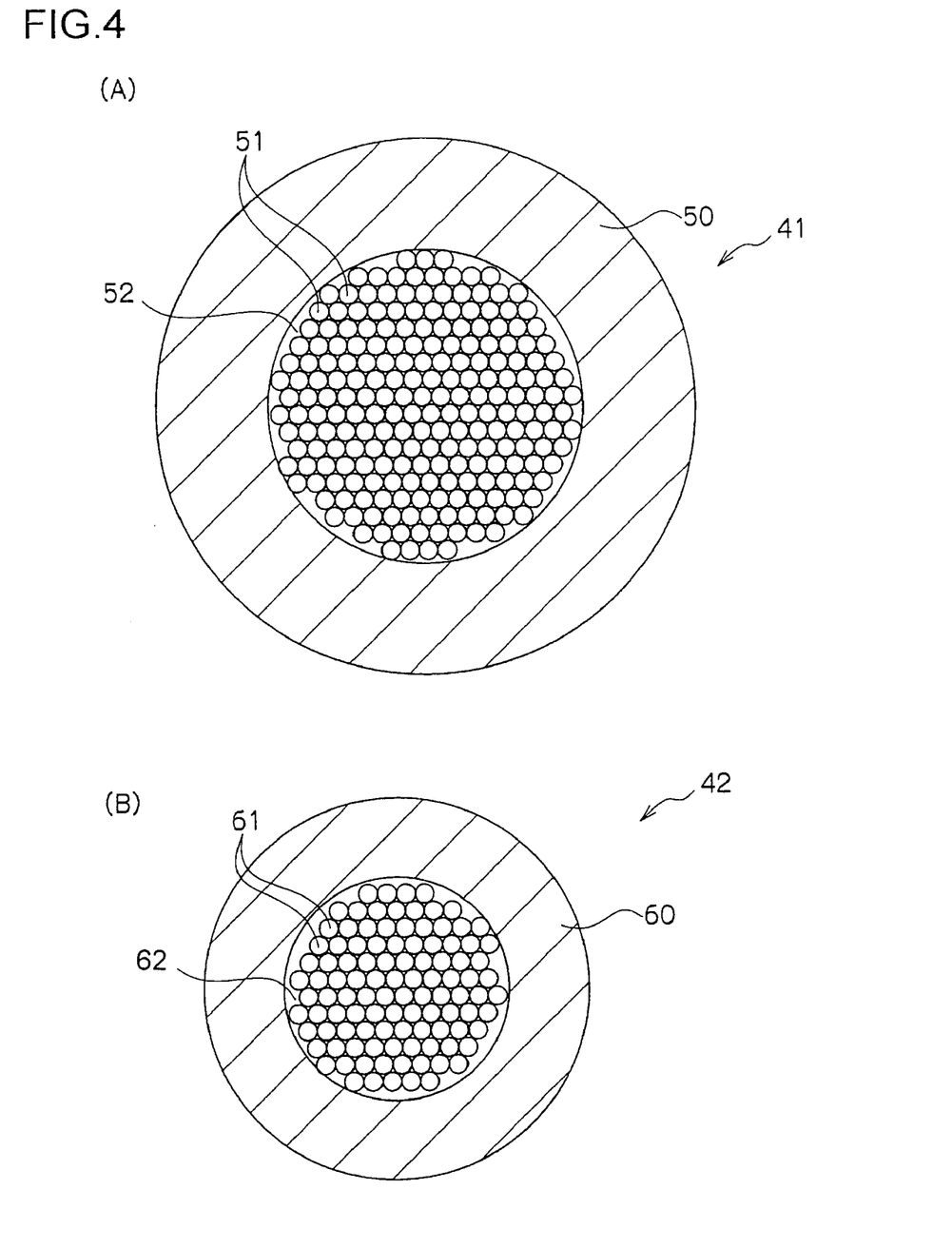
FIG. 4 is a cross-sectional view illustrating an example of reinforcing elements that are disposed in the high-strength cable (tether cable) according to the present invention.

FIG. 4(A) illustrates an example of the sectional structure of the reinforcing element 41 and FIG. 4(B) illustrates an example of the sectional structure of the reinforcing element 42.

As illustrated in FIG. 4(A), the reinforcing element 41 has a coating element 50, plural fiber elements 51 that are disposed in the coating element 50 and are made of copolyparaphenylene-3,4'-oxydiphenyleneterephthalic amide, and a filling material 52 that are filled between the fiber elements 51. Likewise, as illustrated in FIG. 4(B), the reinforcing element 42 has a coating element 60, plural fiber elements 61 that are disposed in the coating element 60 and are made of copolyparaphenylene-3,4'-oxydiphenyleneterephthalic amide, and a filling material 62 that are filled between the fiber elements 61. The coating elements 50 and 60 are formed of, for example, a polyethylene resin, and the filling materials 52 and 62 is formed of vinylester. As the copolyparaphenylene-3,4'-oxydiphenyleneterephthalic amide, Technora (registered trademark) that is manufactured by Teijin Techno Products Limited can be used.

As such, since the plural fiber elements 51 and 61 according to the embodiment of the present invention are made of the copolyparaphenylene-3,4'-oxydiphenyleneterephthalic amide, as compared with the case where the plural fiber elements according to the related art are made of polyparaphenylene terephthalamide, the following effects are obtained. That is, since the copolyparaphenylene-3,4'-oxydiphenyleneterephthalic amide includes ether binding, flexibility is applied to molecules and it becomes difficult to cause bucking or fibrillation. Since horizontal compression stress is strong, separation with the contacting filling materials is suppressed, with respect to a load such as bending, water pressure, and lateral compression affected when the tether cable is actually used. As a result, the reduction in the strength of when the tether cable 10 is actually used is decreased, and the lifespan of the tether cable 10 can be increased.

The horizontal compression stress according to the present invention is represented by a load for 1 dtex, when a single fiber is compressed in a direction vertical to a fiber axis and a compression rate becomes 80%. In this invention, the horizontal compression stress needs to be 75 cN/dtex or more, preferably 80 cN/dtex or more. Further, fiber surface hardness of the fiber elements 51 and 61 is preferably high. As such, if the fiber surface hardness of the fiber elements 51 and 61 is increased, even in an environment where the bending, the water pressure, and the lateral compression are applied when the cable is used, the plural fiber elements 51 and 61 and the filling materials 52 and 62 corresponding to the resin can be further firmly adhered. As a result, the lifespan of the tether cable 10 can be further increased.

The fiber surface hardness in this invention is hardness of when a probe having a spring constant of 154 N/m is pressed in a direction vertical to the fiber axis, with a pressing force (corresponding to the depth of 35 nm) of a voltage of 0.3V. As a reference sample, mica that is used as a base of a single fiber when the probe is pressed is used. In this case, the hardness is preferably 1% or more and is more preferably 1.5% or more. A mica plate that is used when the hardness is measured is manufactured using Russia white mica (muscovite).

As a method that increases, by 1% or more, the fiber surface hardness of the copolyparaphenylene-3,4'-oxydiphenyleneterephthalic amide fiber to be less than 1% with respect to the hardness of the mica, a method that performs heat treatment on the fiber with the high temperature of 400 C.° or more is exemplified. However, the present invention is not limited to this method, and any method that can increase, 1% or more, the hardness with respect to the hardness of the mica may be used.

If the reinforcing elements are formed using the fiber elements having the above-described characteristic and the tether cable is formed by twisting the plural reinforcing elements, high fatigue resistance can be maintained with respect to the various loads applied when the tether cable is actually used, particularly, the bending and the lateral compression. Therefore, a tether cable having the long lifespan can be provided.

EMBODIMENT

Hereinafter, the present invention will be described in detail on the basis of embodiments. An evaluation method that is used in the embodiments is as follows.

(1) Horizontal Compression Strength of a Single Fiber

After a single fiber is arranged on a diamond plate and an end is fixed thereon, a load for 1 dtex of when the diamond plate is pressed from the right upper side and a compression rate becomes 80% is measured. The compression rate is calculated from the single fiber diameter D before the compression and the single fiber diameter $D_1$ from a right upper direction at the time of the compression, using the following equation.

$$\text{Compression rate}(\%) = (D - D_1)/D \times 100$$

(2) Surface Hardness of a Single Fiber Surface

After a single fiber is arranged on a mica plate and an is fixed thereon, a probe having a spring constant of 154 N/m is pressed in a direction vertical to the fiber axis, with a pressing force (corresponding to the depth of 35 nm) of a voltage of 0.3 V, with respect to the surface thereof, the surface hardness is calculated by dividing the load of when the probe is pressed by a volume of a concaved portion, and a ratio with the hardness of the mica measured by the same method is calculated using the following equation.

$$\text{Surface hardness ratio}(\%) = (\text{hardness of a single fiber})/(\text{hardness of mica}) \times 100$$

(3) Compression Fatigue Resistance of a Reinforcing Element

Both sides are interposed with an aluminum plate having an angle of 22 mm from the side of a reinforcing element, and a load of 50 kgf is applied in a compression tester. This process is used as one cycle, the load is repetitively applied with a ratio of 7 sec./cycle, and tensile strengths of the reinforcing element after 100 cycles and 1000 cycles are measured. A strength retention rate is calculated by the following equation using the tensile strength of the reinforcing element before the compression, and is used as the compression fatigue resistance.

$$\text{Compression fatigue resistance}(\%) = (\text{tensile strength after the compression})/(\text{tensile strength before the compression}) \times 100$$

(4) Section Flatness after Compressing the Reinforcing Element

The section flatness is calculated by the following equation, using the short diameter and the long diameter of the reinforcing element after the compression test described in (3) is performed.

$$\text{Section flatness} = (\text{long diameter after the compression})/(\text{short diameter after the compression})$$

(5) Water Pressure Fatigue Resistance of a Reinforcing Element

After the reinforcing element is inserted into a test tank with the high water pressure, the water pressure is applied in a state where the test tank is filled with water, and the reinforcing element is maintained at the water pressure of 120 MPa for 30 minutes, the water pressure is decreased to 0 MPa. This process is used as one cycle and the tensile strength of the reinforcing element after 200 cycles is measured. A strength retention rate is calculated by the following equation, using the tensile strength of the reinforcing element before the test, and is used as the water pressure fatigue resistance.

$$\text{Water pressure fatigue resistance}(\%) = (\text{tensile strength after the water pressure})/(\text{tensile strength before the water pressure}) \times 100$$

(6) Fatigue Test

The fatigue test is performed using a fatigue tester 65 illustrated in FIG. 5(A). The fatigue tester 65 illustrated in FIG. 5(A) has a sheave 70 and a roller 71, and a high-strength cable 10 and a wire 72 are rolled around the sheave 70 and the roller 71. A load cell 80 is provided in a connection portion of the high-strength cable 10 and the wire 72 and a load LD is applied to the high-strength cable 10. The diameter of the sheave 70 is 400 mm and the load LD is 29.4 kN. In this state, the sheave 70 is alternately rotated by about 180 degrees and a rotation count until the high-strength cable 10 reaches fracturing is measured.

Embodiment 1

After copolyparaphenylene-3,4'-oxydiphenyleneterephthalic amide fibers (Technora (registered trademark) T741 manufactured by Teijin Techno Products Limited) where a single yarn weaving rate is 1.67 dtex, horizontal compression stress is 94 cN/dtex, and a hardness ratio of a single fiber surface is 1.7% with respect to mica are bound to form a fiber bundle, such that a total waving rate becomes 6600 dtex, a vinylester resin is impregnated and hardened, a polyamide resin is coated, and a reinforcing element having the diameter of 1.3 mm is obtained. In the same manner, a vinylester resin is impregnated and hardened in the copolyparaphenylene-3, 4'-oxydiphenyleneterephthalic amide resin bundle where a total waving rate becomes 4400 dtex, a polyamide resin is coated, and a reinforcing element having the diameter of 1.1 mm is obtained.

As a measurement result of the compression fatigue resistance with respect to the reinforcing element having the diameter of 1.1 mm, the compression fatigue resistance is 100% after 100 cycles and 1000 cycles. At this time, the section flatness is 1.07 after 100 cycles and 1.14 after 1000 cycles.

As a measurement result of the water pressure fatigue resistance using the reinforcing element, the water pressure fatigue resistance is 100%.

Twisting is alternately performed in two layers on the inner coating using the reinforcing elements, and the high-strength cable 10 is obtained.

Figure 5:
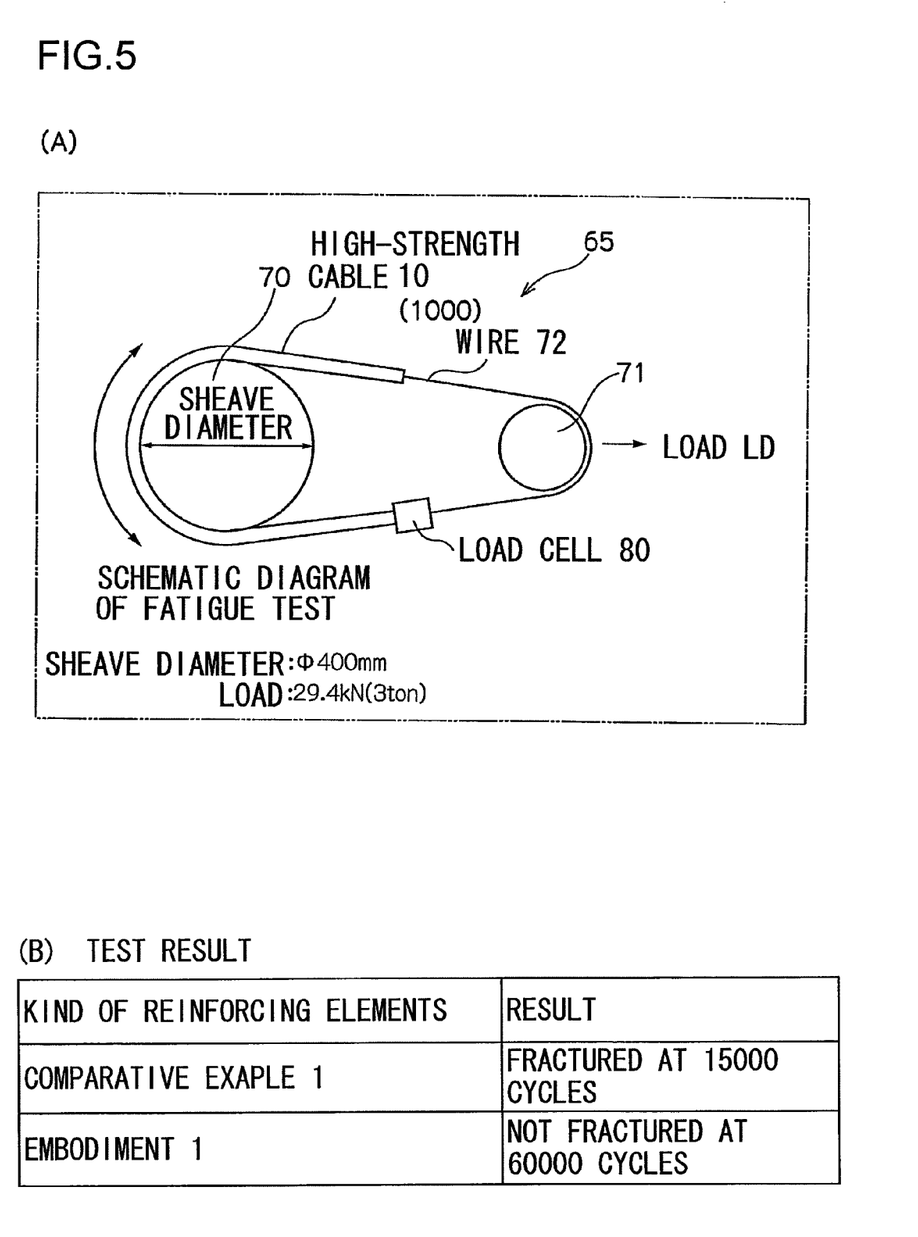
FIG. 5(A) is a diagram illustrating a fatigue tester that performs a fatigue test with respect to a high-strength cable according to an embodiment of the present invention and a high-strength cable according to a related art.
FIG. 5(B) is a diagram illustrating a fatigue rest result thereof.

As a result that is obtained when the high-strength cable is disposed in the fatigue tester 65 as illustrated in FIG. 5 and is fatigued under the load of 29.4 kN, the high-strength cable does not reach the fracturing even after 60000 cycles.

Comparative Example 1

After polyparaphenylene terephthalamide resins (Kevlar (registered trademark) 49 that is manufactured by Du Pont-Toray Co., Ltd.) where a single yarn weaving rate is 1.58 dtex, horizontal compression stress is 70 cN/dtex, and a hardness ratio of a single fiber surface is 1.8% with respect to mica are bound to form a fiber bundle, such that a total waving rate becomes 6600 dtex, a vinylester resin is impregnated and hardened, a polyamide resin is coated, and a reinforcing element having the diameter of 1.3 mm is obtained. In the same manner, a vinylester resin is impregnated and hardened in the polyparaphenylene terephthalamide resin bundle where a total waving rate becomes 4400 dtex, a polyamide resin is coated, and a reinforcing element having the diameter of 1.1 mm is obtained.

As a measurement result of the compression resistance with respect to the reinforcing element having the diameter of 1.1 mm, the compression resistance is 79% after 100 cycles and 55% after 1000 cycles. At this time, the section flatness is 1.31 after 100 cycles and 1.47 after 1000 cycles.

As a measurement result of the water pressure fatigue resistance using the reinforcing element, the water pressure fatigue resistance is 67%.

Twisting is alternately performed in two layers on the inner coating using the reinforcing elements, and the high-strength cable 1000 is obtained.

As a result that is obtained when the high-strength cable is disposed in the fatigue tester 65 as illustrated in FIG. 5 and is fatigued under the load of 29.4 kN, the high-strength cable is fractured at 15000 cycles.

FIG. 5(B) illustrates a compared fatigue test result of plural fiber elements 51 and 61 made of copolyparaphenylene-3,4'-oxydiphenyleneterephthalic amide according to an embodiment of the present invention and plural fiber elements made of polyparaphenylene terephthalamide according to the related art.

As illustrated in FIG. 5(B), the high-strength cable 1000 according to the related art is fractured at 15000 cycles. However, if the high-strength cable is formed using the copolyparaphenylene-3,4'-oxydiphenyleneterephthalic amide resin object where the horizontal compression strength of the single fiber is 75 cN/dtex or more, durability can be improved to become four times more than that in the high-strength cable 1000 according to the related art.

Meanwhile, the present invention is not limited to the above embodiments, and various modifications can be adopted.

For example, the high-strength cable according to the embodiment of the present invention can be used as an ocean floor laying cable laid in an ocean floor as well as the unmanned exploration system.

The high-strength cable according to the embodiment of the present invention can be used as the secondary cable 11 as well as the tether cable 10 corresponding to the primary cable.

(Further, the high-strength cable according to the embodiment of the present invention can be applied to ropes such as an elevator cable).

The twisted layer 21 includes the first reinforcing element layer 31 and the second reinforcing element layer 32. However, the present invention is not limited thereto and tensile strength layers of three layers or more may be included.

The invention claimed is:

1. A high-strength tether cable for a deep sea exploration machine, comprising:
an outer coating defining an outer periphery of the high-strength tether cable; and
a plurality of non-metallic reinforcing elements disposed within the outer coating, wherein
each of the plurality of non-metallic reinforcing elements includes:
a coating element defining an outer periphery of each individual non-metallic reinforcing element,
a plurality of fiber elements disposed within the coating element; and
a filling material, separate from the coating element, disposed between each of the plurality of fiber elements,
each of the plurality of non-metallic reinforcing elements contacts at least one other of the plurality of non-metallic reinforcing elements,
each of the plurality of fiber elements is made of copolyparaphenylene-3,4'-oxydiphenyleneterephthalic amide, and
the lateral compression stress of each of the plurality of fiber elements of the copolyparaphenylene-3,4'-oxydiphenyleneterephthalic amide is 75 cN/dtex or more.

2. The high-strength tether cable according to claim 1, wherein a ratio of a surface hardness of each of the plurality of fiber elements divided by a surface hardness of mica is 1% or more.

3. The high-strength tether cable according to claim 1, wherein
the plurality of non-metallic reinforcing elements includes a plurality of inner reinforcing elements and a plurality of outer reinforcing elements,
the plurality of inner reinforcing elements is disposed in a first circumferential array,
the plurality of outer reinforcing elements is disposed in a second circumferential array, and
the second circumferential array is disposed between the first circumferential array and the outer coating.

4. The high-strength tether cable according to claim 3, wherein
each of the plurality of inner reinforcing elements is arranged to be inclined in a first direction relative to a central axis of the high-strength tether cable,
each of the plurality of outer reinforcing elements is arranged to be inclined in a second direction relative to the central axis of the high-strength tether cable, and
the first direction is different from the second direction.

5. The high-strength tether cable according to claim 4, wherein the first direction is opposite the second direction relative to the central axis of the high-strength tether cable.

6. The high-strength tether cable according to claim 3, wherein a thickness of each of the plurality of outer reinforcing elements is smaller than a thickness of each of the plurality of inner reinforcing elements.

7. The high-strength tether cable according to claim 3, wherein each of the plurality of inner reinforcing elements is in contact with at least one of the plurality of outer reinforcing elements.

8. The high-strength tether cable according to claim 1, wherein the filling material is formed of vinylester.

9. The high-strength tether cable according to claim 1, wherein the coating element is formed of a polyethylene resin.

10. The high-strength tether cable according to claim 1, wherein each of the plurality of fiber elements is heat treated to a temperature of 400 degrees Celsius or more.

11. A high-strength tether cable for a deep sea exploration machine, comprising:
an outer coating defining an outer periphery of the high-strength tether cable; and
a plurality of non-metallic reinforcing elements disposed within the outer coating, wherein
each of the plurality of non-metallic reinforcing elements includes:
a coating element defining an outer periphery of each individual non-metallic reinforcing element,
a plurality of fiber elements disposed within the coating element; and
a filling material, separate from the coating element, disposed between each of the plurality of fiber elements, and
each of the plurality of non-metallic reinforcing elements contacts at least one other of the plurality of non-metallic reinforcing elements.

12. The high-strength tether cable according to claim 11, wherein
the plurality of non-metallic reinforcing elements includes a plurality of inner reinforcing elements and a plurality of outer reinforcing elements,
the plurality of inner reinforcing elements is disposed in a first circumferential array,
the plurality of outer reinforcing elements is disposed in a second circumferential array, and
the second circumferential array is disposed between the first circumferential array and the outer coating.

13. The high-strength tether cable according to claim 12, wherein
each of the plurality of inner reinforcing elements is arranged to be inclined in a first direction relative to a central axis of the high-strength tether cable,
each of the plurality of outer reinforcing elements is arranged to be inclined in a second direction relative to the central axis of the high-strength tether cable, and
the first direction is different from the second direction.

14. The high-strength tether cable according to claim 13, wherein the first direction is opposite the second direction relative to the central axis of the high-strength tether cable.

15. The high-strength tether cable according to claim 12, wherein a thickness of each of the plurality of outer reinforcing elements is smaller than a thickness of each of the plurality of inner reinforcing elements.

16. The high-strength tether cable according to claim 12, wherein each of the plurality of inner reinforcing elements is in contact with at least one of the plurality of outer reinforcing elements.

* * * * *